Jan. 4, 1938. A. MATTHIES 2,104,372
RECLINING COUCH FOR USE IN MOTOR VEHICLES
Filed Oct. 6, 1936
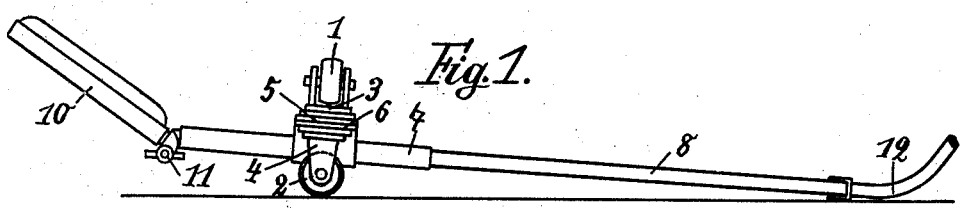
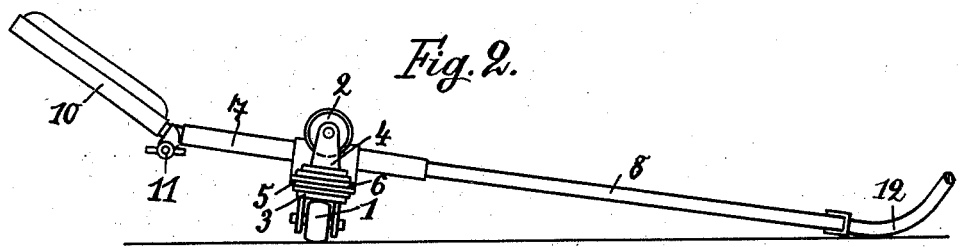
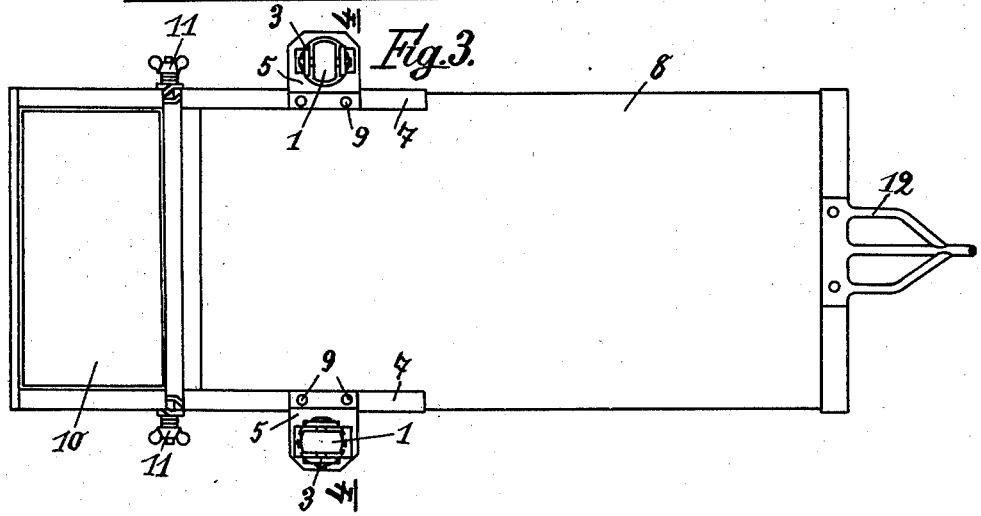
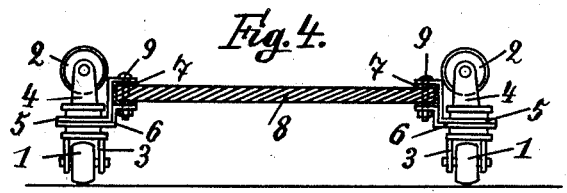
Inventor:
August Matthies Patented Jan. 4, 1938

2,104,372

UNITED STATES PATENT OFFICE 2,104,372

RECLINING COUCH FOR USE IN MOTOR VEHICLES

August Matthies, Elbingerode/Harz, Germany

Application October 6, 1936, Serial No. 104,204
In Germany October 19, 1934

1 Claim. (Cl. 280—61.5)

The invention relates to a reclining couch for motor vehicles wherein the runner rollers can be swivelled to allow the couch to be moved forwards, backwards and sideways. The swivel rollers are arranged in pairs on each side of the couch and mutually displaced so that the angle of inclination of the couch can be reduced or increased, by turning the pairs of rollers, to suit the actual conditions for which the reclining couch is to be used.

An embodiment of the invention is illustrated by way of example in the accompanying drawing in which:—

Fig. 1 shows a reclining couch in side elevation with the pairs of rollers in the position to give the couch the least inclination.

Fig. 2 is a similar view to Fig. 1 but with the rollers in the position to give the couch the maximum inclination.

Fig. 3 shows the couch in top plan view.

Fig. 4 is a cross section on line 4—4 of Fig. 3.

The runner wheels of the reclining couch are constructed as swivel wheels 1, 2 arranged in pairs and mutually displaced on each side of the couch. The bearings 3, 4 of the rollers are each pivotally mounted on two angle pieces 5, 6 one engaging over and the other under the edge frame 7 of the reclining surface 8 (Fig. 4) and interconnected by bolts 9. By suitably constructing the angle pieces 5, 6 the swivel rollers 1 can be nearer the reclining surface 8 than the swivel rollers 2 (Fig. 2) so that the inclination of the couch can be varied according to whether the rollers 2 (Fig. 1) or the rollers 1 (Fig. 2) rest on the ground.

The head rest 10 is adjustably reversible and secured in its adjusted position by wing nuts 11. The hitch device 12 is constructed so that it supports the foot end of the couch irrespectively of the angle of inclination shown in Figs. 1 and 2.

I claim:—

A reclining couch for motor vehicles, comprising in combination a reclining surface, pairs of mutually displaced swivel rollers mounted one pair on each side of said surface to allow the couch to be moved forwards, backwards and sideways when in use, angle pieces carrying said pairs of rollers adapted to be reversibly secured to said reclining surface to support said surface on one or other of the rollers of said pairs of rollers to adjust the inclination of said surface, a head rest adjustable on one end of said surface, wing nuts adapted to secure said head rest in its adjusted position, and a hitch device secured to the other end of said surface irrespectively of its angle of inclination.

AUGUST MATTHIES.